April 2, 1963  R. J. MATTHEWS ETAL  3,083,721
CONSTANT MASS FLOW REGULATOR
Filed May 25, 1959
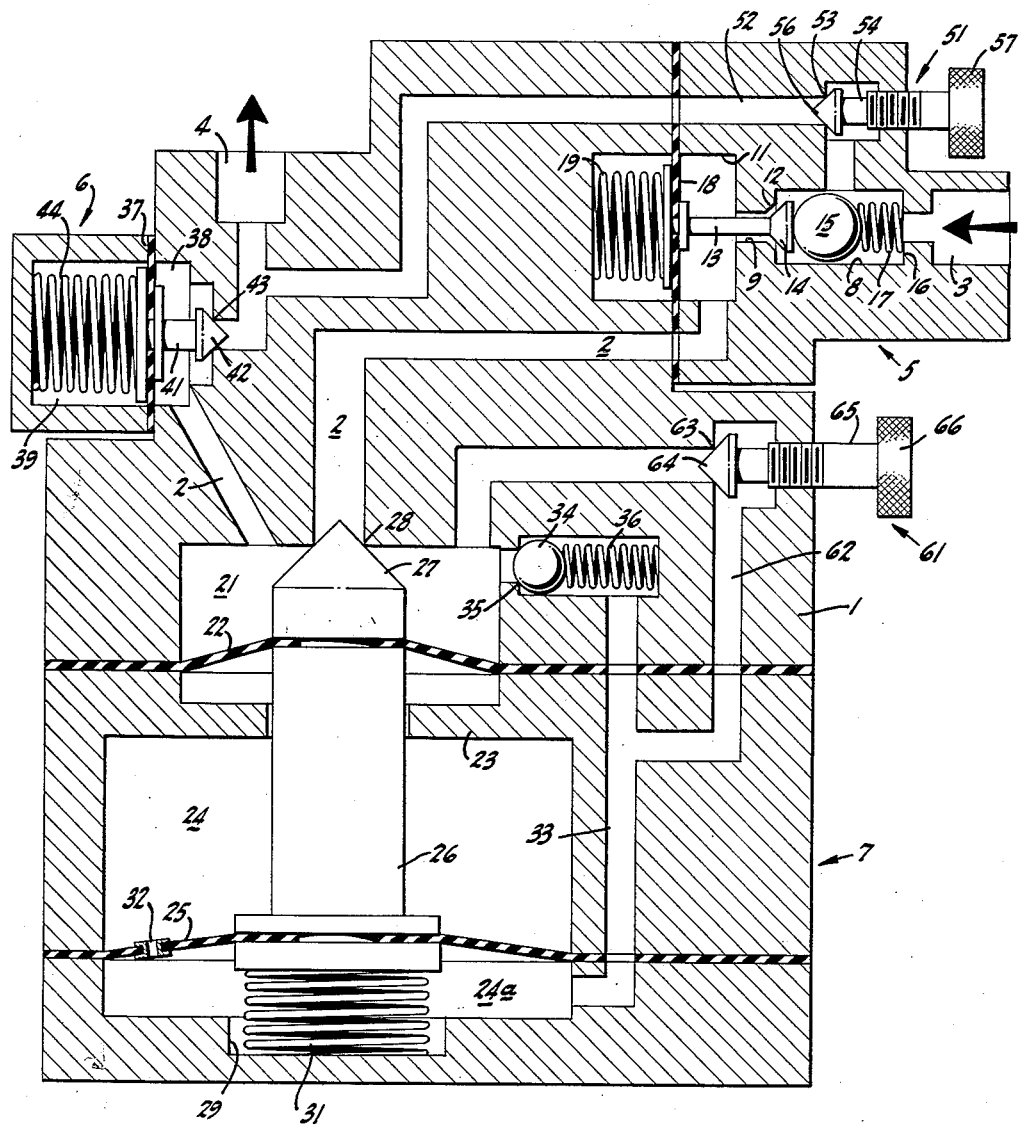
INVENTORS
LEROY J. GEE
ROBERT J. MATTHEWS
BY
ATTORNEYS

United States Patent Office 3,083,721
Patented Apr. 2, 1963

3,083,721
CONSTANT MASS FLOW REGULATOR
Robert J. Matthews, Menlo Park, and Leroy J. Gee, Palo Alto, Calif., assignors to American Radiator & Standard Sanitary Corporation, New York, N.Y., a corporation of Delaware
Filed May 25, 1959, Ser. No. 815,642
9 Claims. (Cl. 137—63)

This invention relates to and in general has for its object the provision of a constant mass flow regulator.

In self-contained underwater breathing apparatus, one of the major problems involved is the metering of small quantities of gas at constant rates, against wide ambient pressure variations caused by the different depths at which the equipment must operate; heretofore critical orifices have been used as the primary flow-regulating device. For depths up to 300 feet and required flow rates of 4 to 23 liters per minute, supply pressures of approximately 300 p.s.i.g. and orifice diameters as small as 0.008 in. are required, and because the small-diameter orifices are subject to clogging, they must be protected adequately by suitable filters. An approach that would avoid use of small orifices is the utilization of long capillary tubes, but the extreme length required for each increment of diameter increase makes this approach rather prohibitive. If relatively large-diameter passages are required, then the use of continuous flow-regulating devices such as orifices or capillary tubes cannot be employed satisfactorily.

Another object of this invention is the provision of an oscillating valve including: a valve body provided with upper and lower chambers separated by a common wall; a valve stem arranged for axial movement through said common wall within said chambers; a first diaphragm extending across said upper chamber intermediate its ends and sealed to said valve stem; a second diaphragm extending across said lower chamber and sealed to said valve stem; a valve seat formed in said upper chamber in axial alignment with said valve stem; a valve closure member formed on said valve stem and arranged to close on said valve seat; a by-pass extending between said upper chamber at a point above said first diaphragm and said lower chamber at a point above said second diaphragm; a second by-pass extending between said upper chamber at a point above said first diaphragm and said lower chamber at a point below said second diaphragm; and a downwardly opening check valve provided in said second by-pass.

More specifically, one of the objects of this invention is the provision of a constant mass flow regulator including an oscillating valve, a first pressure reduction valve located upstream of said oscillating valve for delivering gas to the oscillating valve at a fixed predetermined pressure and opening said valve; a second pressure reduction valve located downstream of said oscillating valve for receiving gas from said oscillating valve and discharging such gas at a fixed and predetermined pressure; and means responsive to the pressure of gas upstream of said oscillating valve when said oscillating valve is open for periodically closing said oscillating valve.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

The single FIGURE of the drawings is a top plane view of a regulator embodying the objects of our invention.

As schematically illustrated in the drawings, our regulator includes a body 1 provided with a conduit 2 having an inlet 3 at one end thereof and an outlet 4 at its other end. Interposed in the conduit 2 adjacent its inlet 3 is a first fluid pressure regulating valve generally designated by the reference numeral 5 and of conventional construction. Similarly inserted in the conduit 2 adjacent its outlet 4 is a second fluid pressure regulating valve of conventional construction and generally designated by the reference numeral 6, and interposed in the conduit 2 between the valves 5 and 6 is a normally closed multivibrator valve generally designated by the reference numeral 7 and of special construction.

Forming a section of the conduit 2 adjacent the inlet 3 is a bore 8 communicating through a restricted passageway 9 with a diaphragm chamber 11. Provided in the upstream end of the passageway 9 is a tapered valve seat 12. Extending through the passageway 9 and having substantial clearance therewith is a valve stem 13. Formed on the upstream end of the stem 13 is a tapered valve closure head or member 14 arranged to restrict or even close the passageway 9. Loosely accommodated in the bore 8 is a ball 15 and disposed between the ball 15 and a shoulder 16 formed in the inlet 3 is a compression spring 17 functioning to maintain the ball 15 in contact with the head 14.

Clamped and sealed across the diaphragm chamber 11 is a flexible diaphragm 18 and secured centrally thereof is the downstream end of the valve stem 13. Backing the diaphragm 18 is a compressing spring 19 serving to bias the valve 5 towards its open position.

Although not illustrated, the inlet 3 is arranged to be connected with a source of fluid under pressure such as a tank containing a breathing gas such as a mixture of nitrogen and oxygen.

The function of the regulating valve 5 is simply to reduce the pressure of any fluid passing through it to a fixed value which in the case of underwater breathing apparatus may be in the order of 400 p.s.i.

Here it should be noted that for all practical purposes the bore 8, reduced passageway 9, and diaphragm chamber 11 can be considered as parts or sections of the conduit 2.

Also included as part of the conduit 2 is a second diaphragm chamber 21 forming part of the vibrating valve generally designated by the reference numeral 7. Extending across the chamber 21 is a flexible diaphragm 22. Defining the floor of the chamber 21 is a wall 23, this wall also serving as the ceiling of a third diaphragm chamber 24. Extending across the chamber 24 intermediate its ends is a flexible diaphragm 25.

Mounted on the diaphragms 22 and 25 is a valve closure pin 26 having a tapered upper end 27 arranged to seat on the lower end of an axial section 28 of the conduit 2. Seated in a recess 29 formed in the valve body 1 is a compression spring 31, the upper end of this spring being in abutment with the lower end of the pin 26. As a result of this construction the spring 31 serves to bias the valve 7 towards its closed position.

Establishing communication between the chamber 24 and the subchamber 24a is a constricted passageway here shown in the form of a grommet 32 mounted in the diaphragm 25. Extending between the diaphragm chamber 21 and that portion 24a of the diaphragm chamber 24 located below the diaphragm 25 is a passageway 33. Interposed in the passageway 33 is a ball check valve including a ball 34 arranged to seat on a shoulder 35 and backed by a compression spring 36. The ball 34 should seat only loosely on the shoulder 35 so that when in its closed position fluid can leak around it.

Here it should be particularly noted that the effective area of diaphragm 25 should be substantially greater than the effective area of diaphragm 22. To achieve this result chamber 24 ideally should be isolated. Practically, however, passage 32 has been provided to eliminate the large steady state pressure balances which otherwise would occur across diaphragms 22 and 25. Passage 32 provides substantial restriction to fluid flow to accomplish this function of steady state pressure balancing but without interfering with the dynamic mode of operation of valve 7.

The valve 6 includes a diaphragm chamber divided by a flexible diaphragm 37 into subchambers 38 and 39. Mounted on the diaphragm 37 is a valve pin 41 having a tapered closure head 42 arranged to seat on one end of a section 43 of the conduit 2. Mounted within the subchamber 39 is a compressing spring 44 serving to bias the valve 6 towards its closed position. The function of the valve 6 is to restrict the pressure of the fluid passing therethrough to the outlet 4 to a fixed value in the order of 300 p.s.i. so that metering will be constant and independent of ambient pressure.

When used in conjunction with underwater breathing apparatus the outlet 4 of a regulator of this character can be conneceted directly or through suitable hose sections with the breathing apparatus.

In addition to the above elements, the regulator above described should preferably be provided with a hand-operated by-pass valve generally designated by the reference number 51 and with a hand-operated metering valve generally designated by the reference numeral 61.

The valve 51 is disposed in a line 52 between outlet 4 and the bore 8 and consists of a valve seat 53 formed in the line 52 and a valve stem 54 threaded in the valve body 1 coaxially with the valve seat. Mounted on or formed integral with the inner end of the stem 54 is a tapered valve closure head 56 arranged to close on the seat 53 and secured to the outer end of the stem 54 is a knurled button 57.

The valve 61 is disposed in a line 62 shunted around the check valve ball 34 and consists of a seat 63 formed in the line 62 and a tapered valve closure member 64 arranged to close thereon. The closure member 64 is mounted on or formed integral with a valve stem 65 threaded in the valve body 1 coaxially with the seat 63 and the outer end of the valve stem is provided with a knurled operating button 66.

In initially describing the operation of our regulator it will be assumed that both of the valves 51 and 61 are closed or that the regulator is devoid thereof and their connecting lines.

A fluid such as a breathing mixture of nitrogen and oxygen entering the inlet 3 at a pressure higher than the pressure $P_1$ for which the valve 5 is set will be reduced to pressure $P_1$ in passing through this valve. This fluid at pressure $P_1$ operates on the upper end of the tapered valve closure member 27 and forces this member downwardly against the biasing action of the compression spring 31. With the closure member 27 open, fluid flows into the upper diaphragm chamber 21 and there the fluid acts on the upper face of the diaphragm 22 to further open the valve 7. Concurrently, fluid from the chamber 21 passes upwardly into the valve 6 and depresses the diaphragm 37 against the action of the biasing spring 44. The valve 6 is thus opened and permits the egress of fluid through the outlet 4 at a predetermined pressure $P_2$, say for example in the order of 400 p.s.i. Also during this time fluid from the chamber 21 passes the check valve ball 34 and downwardly through the passageway 33 into the subchamber 24a. Fluid continues to pass from chamber 24a into a chamber 24 through passage 32. However, since the diaphragm chamber 24 is relatively large and the hole 32 is relatively small, whereas the subchamber 24a is relatively small and the passageway 33 is relatively large, the rate at which pressure will build up in the chamber 24 will be considerably less than the rate at which the pressure will build up in the subchamber 24a. As a result of this unbalanced condition, the valve 7 will close immediately after it has been opened and cannot again assume its open position until the pressure in the subchamber 24a has been relieved. This can take place only by the leakage of fluid around the check valve ball 34.

With a sufficient pressure reduction in the chamber 24a, the 400-p.s.i.g. gas passing the valve 5 will again force the valve 7 to its open position and the valve 7 will repeat its cycle of operation. This results in short spurts of 300-p.s.i.g. gas being forced from the outlet 4 into the breathing apparatus.

With uninterrupted flow into the subchamber 24a and restricted leakage therefrom, the time constants for charging and discharging this chamber are of course different. By opening or cracking the metering valve 61 the discharging time constant of the subchamber 24a is made smaller. The same variation can be achieved by using a constant opening of valve 61 and changing the volume of subchamber 24a by, for example, inserting a piston. Since the multivibrator valve 7 cannot be opened until the pressure in the subchamber 24a has been reduced, the effect of controlling this rate of pressure reduction provides a means by which the frequency of oscillation and therefore the flow rate is controlled.

Initially, the valve 7 will vibrate several times during the pressure build-up process in the regulator before any outlet gas is obtained; this is normal. As soon as a regular pulsing discharge is obtained, the valve 61 can be adjusted to produce the desired flow from the outlet 4 into the breathing apparatus.

The pressure of the gas in the supply tank to which the inlet 3 is connected must, of course, be greater than the minimum required for oscillating the valve 7.

Although for purposes of illustration it has been assumed in the above description that the valve 5 is designed to reduce the pressure of the incoming gas to 400 p.s.i. and that the valve 6 is set to deliver gas from the outlet 4 at a pressure in the order of 300 p.s.i., these settings are of course merely representative.

Although no single dimension of our regulator is critical, it should be noted that the valve 7 will operate only if the charging rate of chamber 24 is less than that of chamber 24a, for otherwise the valve 7, once open, would remain open. Otherwise expressed, the resistance to the flow of gas through the relatively small hole 32 must be greater than the resistance to the flow of gas through the relatively large passageway 33. The time required for charging the chamber 24 represents the time that the valve 7 remains open. The time constant for the chamber 24 is of course the same for charging and discharging.

With the valve 61 closed, the chamber 24a requires a relatively long time to discharge. The longer this discharging time, the lower the oscillating frequency of the valve 7 and the lower the rate of flow therethrough. If the valve 61 is opened, the charging time of the chamber 24a will be only slightly shorter, for the passageway 33, being relatively large, is sufficient to take care of the flow. Consequently within normal flow ranges the valve 61 has very little effect on the charging time of the chamber 24a. On the other hand, the valve 61 has a very profound effect on the discharging time of the chamber 24a. With the valve 61 closed, the chamber 24a can discharge only by leakage past the ball 34. With this maximum discharging time the valve 7 will vibrate or oscillate at its lowest frequency. By opening the valve 61, discharge of the subchamber 24a takes place primarily around the ball check valve at a much higher rate, and consequently the valve 7 will oscillate at a correspondingly higher rate.

The setting of the outlet valve 6 determines the pressure at which gas leaves the regulator. The setting utilized for the underwater breathing application should be roughly twice the ambient pressure at the maximum depth for which the flow regulator is designed, this being desirable to insure that the flow through the outlet valve 6 is always sonic so that the ambient depth pressure will not affect the flow rate.

The manual by-pass valve 51 is desirable when the regulator is applied to underwater breathing apparatus and permits by-passing of the normal breathing circuit in case of component failure. This by-pass line may be made to function automatically, if desired, or completely eliminated, depending upon the use to which the regulator is applied.

From the above description it will be appreciated that our regulator essentially consists of a vibrating or oscillating valve, a pressure reduction valve located upstream of the oscillating valve and serving to deliver gas to the oscillating valve at a fixed predetermined pressure; and a pressure regulating valve located downstream of the oscillating valve and functioning to discharge gas from the oscillating valve at a fixed predetermined pressure.

Although the disclosure made herein applies to a regulator having normally closed first and second valves, the principle of operation involved would apply equally well to a design utilizing normally open valves or a normally open and a normally closed valve. The basic principle of operation of this invention involves utilization of positive feedback to actuate a valve in one direction, and, after a time delay, a negative feedback to actuate that same valve in the other direction.

Since the disclosure made in this application is directed to those skilled in the art, and since the details of construction of our regulator and its oscillating valve are, per se, not deemed to involve invention, these members have been illustrated schematically.

We claim:

1. A constant mass flow regulator comprising: a valve body provided with a chamber; an axially movable valve stem disposed in said chamber; first sealing means extending across the upper end of said chamber and sealed to said valve stem and to the side walls of said chamber; second sealing means extending across the lower end of said chamber and sealed to said valve stem and to the side walls of said chamber, said first and second sealing means serving to divide said chamber into upper, intermediate and lower expansible compartments and the cross-sectional area of said upper compartment being smaller than the cross-sectional area of said intermediate compartment; a first constricted passageway extending between said intermediate and lower compartments; a second passageway extending between said upper and lower compartments; a spring-biased leaky check valve disposed in said second passageway for permitting free flow of fluid from said upper compartment to said lower compartment and restricted flow in the reverse direction, the resistance to flow through said first passageway being greater than the resistance to flow through said second passageway when said check valve is open; a valve closure member formed on the upper end of said valve stem; and a valve seat formed in said valve body in alignment with said valve closure member, a fluid pressure inlet to the upper compartment opening in said valve seat; an outlet from said upper compartment, said valve closure member being arranged relative to said valve seat so that inlet pressure urges said valve closure member in an opening direction relative to said seat.

2. A constant mass flow regulator comprising: a valve body provided with a chamber; an axially movable valve stem disposed in said chamber; a first diaphragm means extending across the upper end of said chamber and sealed to said valve stem and to the side walls of said chamber; a second diaphragm means extending across the lower end of said chamber and sealed to said valve stem and to the side walls of said chamber, said first and second diaphragm means serving to divide said chamber into upper, intermediate and lower expansible compartments and the cross-sectional area of said upper compartment being smaller than the cross-sectional area of said intermediate compartment; a first constricted passageway extending between said intermediate and lower compartments; a second passageway extending between said upper and lower compartments; a spring-biased leaky check valve disposed in said second passageway for permitting free flow of fluid from said upper compartment to said lower compartment and restricted flow in the reverse direction, the resistance to flow through said first passageway being greater than the resistance to flow through said second passageway when said check valve is open; a valve closure member formed on the upper end of said valve stem; and a valve seat formed in said valve body in alignment with said valve closure member, a fluid pressure inlet to the upper compartment opening in said valve seat; an outlet from said upper compartment, said valve closure member being arranged relative to said valve seat so that inlet pressure urges said valve closure member in an opening direction relative to said seat.

3. A constant mass flow regulator comprising: a valve body formed with first and second contiguous, intercommunicating chambers, the cross-sectional area of said second chamber being greater than the cross-sectional area of said first chamber; inlet and outlet ports formed in said first chamber; a valve seat formed in said first chamber in communication with said inlet port; a first conduit connected to said inlet port and a second conduit connected at one end to said outlet port and connected at its other end to a pressure-regulating valve; a valve stem disposed in said first and second chambers in axial alignment with said valve seat; a valve closure member formed on one end of said stem and arranged to seat on said valve seat against the fluid pressure at said inlet port; first means for sealing said valve stem to the adjacent walls of said first chamber; second means for sealing said valve stem to the adjacent walls of said second chamber and for dividing said second chamber into a first section contiguous to said first chamber and into a second section having a volumetric capacity smaller than the volumetric capacity of said first section; means for biasing said valve closure member into seating engagement with said valve seat; means for forming a restricted passageway between said first and second chamber sections; a conduit disposed between said second chamber section and said first chamber; and a leaky check valve disposed in said latter conduit for permitting the free flow of fluid from said first chamber to said second chamber section and only restricted flow in the opposite direction.

4. A constant mass flow regulator comprising: a valve body; a first chamber formed in said valve body and provided with a fluid inlet port and with a fluid outlet port, said fluid inlet port being provided with a valve seat; a second chamber provided in said valve body in alignment with said first chamber; an axially movable valve stem disposed in said first and second chambers; first means extending across said first chamber intermediate its ends for sealing said valve stem to said first chamber; second means extending across said second chamber intermediate its ends for sealing said valve stem to said second chamber; valve closure means provided on said stem above said first sealing means arranged to seat on said valve seat against the fluid pressure at said fluid inlet port, the effective area of said first sealing means being substantially less than the effective sealing area of said second sealing means; means for biasing said valve closure means to its closed position; a constricted passageway extending between the upper and lower portions of said second chamber; a by-pass extending between the upper portion of said upper chamber and the lower portion of said lower chamber; a check valve disposed in said by-pass, said valve being so constructed and arranged as to permit the free flow of fluid from said first chamber to said second chamber and only restricted flow in the opposite direction.

5. A constant mass flow regulator of the character set forth in claim 4 including a fluid inlet conduit communicating with said fluid inlet port and a first pressure-regulating valve disposed in said fluid inlet conduit for regulating the pressure of fluid flowing through said conduit into said first chamber.

6. A constant mass flow regulator of the character set forth in claim 5 including a fluid outlet conduit connected at one end to said discharge port; and a second pressure-regulating valve disposed in said fluid outlet conduit intermediate its ends for regulating the pressure of fluid passing through said fluid outlet conduit from said discharge port.

7. A constant mass flow regulator of the character set forth in claim 6 including a passageway connected at one end to said fluid inlet conduit upstream of said first pressure-regulating valve and connected at its other end to said fluid outlet conduit downstream of said second pressure-regulating valve; and a metering valve interposed in said passageway intermediate its ends.

8. A constant mass flow regulator of the character set forth in claim 7 including: a conduit connected at one end to the upper portion of said first chamber and connected at its other end to said by-pass at a point between said check valve and said second chamber; and a metering valve disposed in said conduit intermediate its ends.

9. A constant mass flow regulator of the character set forth in claim 4 including a conduit connected at one end to the upper portion of said first chamber and connected at its other end to said by-pass at a point between said check valve and said second chamber; and a metering valve disposed in said conduit intermediate its ends.

References Cited in the file of this patent

UNITED STATES PATENTS

| | | |
|---|---|---|
| 858,602 | Hopkins | July 2, 1907 |
| 1,087,399 | Phelps | Feb. 17, 1914 |
| 1,966,854 | Eskilson | July 17, 1934 |
| 2,229,829 | Watson | Jan. 28, 1941 |
| 2,664,916 | Conley | Jan. 5, 1954 |
| 2,674,267 | McCarvell | Apr. 6, 1954 |

FOREIGN PATENTS

| | | |
|---|---|---|
| 4,678 | Great Britain | of 1908 |